United States Patent [19]

Koyama et al.

[11] 4,075,159
[45] Feb. 21, 1978

[54] RUBBER COMPOSITIONS WITH BENZOIC ACID COMPOUNDS

[75] Inventors: Tsuneo Koyama; Yuichi Sugiyama; Teruhide Furuhama; Yoshio Tajima, all of Hiratsuka; Hiroshi Kakiuchi, Yokohama; Kazuhiro Yamada, Ihehara; Masaaki Obara, Hiratsuka, all of Japan

[73] Assignee: The Yokohama Rubber Co., Ltd., Tokyo, Japan

[21] Appl. No.: 723,200

[22] Filed: Sept. 14, 1976

Related U.S. Application Data

[63] Continuation of Ser. No. 588,047, June 18, 1975, abandoned.

[30] Foreign Application Priority Data

June 21, 1974  Japan .................................. 49-70258

[51] Int. Cl.$^2$ ........................... C08F 8/28; C08F 8/34; C08C 19/20
[52] U.S. Cl. .............................. 260/42.47; 260/42.32; 260/42.34; 260/42.49; 260/79.5 B; 260/765; 260/782; 526/30

[58] Field of Search ................... 260/79.5 B, 79.5 A, 260/, 79.5 R, 42.47, 42.32, 42.33, 42.34, 42.36, 42.37, 42.43, 42.49, 782, 765; 526/30

[56] References Cited

U.S. PATENT DOCUMENTS

| | | | |
|---|---|---|---|
| 2,045,167 | 6/1936 | Sibley | 260/782 |
| 2,570,632 | 10/1951 | Barton | 260/31.8 |
| 3,027,351 | 3/1962 | Lichty | 260/45.85 |
| 3,596,753 | 8/1971 | Knapp | 198/193 |
| 3,644,268 | 2/1972 | Morita | 260/38 |
| 3,671,478 | 6/1972 | Doyle | 260/23.7 M |
| 3,915,943 | 10/1975 | Wright | 260/79.5 B |

FOREIGN PATENT DOCUMENTS

| | | | |
|---|---|---|---|
| 389,139 | 3/1933 | United Kingdom | 260/782 |

*Primary Examiner*—Christopher A. Henderson
*Attorney, Agent, or Firm*—Finnegan, Henderson, Farabow & Garrett

[57] ABSTRACT

Rubber compositions containing relatively large amounts of benzoic acid or monohydroxy benzoic acid providing vulcanized rubber products having improved adhesion to metallic or fibrous materials and an improved chipping and cutting resistance.

6 Claims, No Drawings

RUBBER COMPOSITIONS WITH BENZOIC ACID COMPOUNDS

This is a continuation of application Ser. No. 588,047, filed June 18, 1975, now abandoned.

This invention relates to rubber compositions for use in the production of improved vulcanized rubber products and, more particularly, to rubber compositions containing benzoic acid or monohydroxy benzoic acid.

In the past it has been known to adhere rubber to metallic materials, such as steel cords, or fibrous materials, such as nylon cords, by plating a copper alloy, such as bronze or brass, onto the surface of steel cords or by treating the surface of nylon cords with a resorcinol formaldehyde latex.

Such methods, however, have not proven entirely satisfactory, particularly in the tire field where the development of high speed and high powered automobiles has created a demand for rubber products of improved adhesive strength.

Recently, rubber has been mixed with white carbon, resorcinol and hexamethylenetetramine; the so-called "HRH" type rubber to improve its adhesive characteristics. However, it has been found that when "HRH" type rubber compositions are mixed in Banbury or roll mixers, they give off fumes owing to the sublimating property of resorcinol, causing problems of environmental pollution and scorching during processing.

It has also been known to use a primary condensate of resorcinol and formalin instead of resorcinol in the "HRH" rubber compositions to overcome these shortcomings of resorcinol; but this creates its own shortcomings, namely, a deterioration in its vulcanizing characteristics as well as its adhesive properties to metallic or fibrous materials.

Further, in OTR (Off The Road) tires and in tires for trucks or buses used under conditions of high load, it is important to have good cutting and chipping resistance properties in the tire treads. Attempts have been made in the past to improve these properties by selecting specific diene-type polymers, for example, combinations of natural rubber and a copolymer of styrene-butadiene, and mixing them with carbon black or inorganic reinforcing fillers. The improvements achieved by these methods, however, have not always been sufficient, and if the amount of carbon black or inorganic reinforcing filler is increased too much, the processing ability of the rubber compositions during mixing is affected, and the build-up of heat during use of the resulting rubber goods is often increased.

Japanese Patent Publication No. 48-38615, for example, discloses the addition of cyclopentadiene type resin into a copolymer of styrene-butadiene to improve the cutting resistance of the tire treads.

Also, it has been known to prevent scorching during the processing of rubber by mixing aromatic carboxylic acids, such as salicylic acid, into rubber. However, the aromatic carboxylic acids tend to delay the vulcanization rate and, therefore, they have been used only in an amount of from 0.1 – 0.5 part by weight per 100 parts of rubber and never more than 1 part at the most.

In accordance with the present invention, it has been found that with the addition of benzoic acid or monohydroxy benzoic acid; i.e., ortho-hydroxy benzoic acid (so-called salicylic acid), meta-hydroxy benzoic acid or para-hydroxy benzoic acid; to rubber in relatively large amounts, excellent adhesion of the rubber to metallic or fibrous materials can be achieved and that there is an excellent improvement in the chipping resistance and the cutting resistance of the tires produced therefrom.

According to this invention, benzoic acid or monohydroxy benzoic acid is mixed with the rubber in an amount of from more than 1 part and, preferably, from 1 to 20 parts by weight per 100 parts of rubber.

If less than 1 part by weight is used, the results cannot be achieved, and by using more than 20 parts by weight, undesirable features such as delay in the vulcanization rate and deterioration of the physical properties of the resulting products may appear.

The preferable amounts of the agents of this invention to be included depend on the kinds of rubber to be used, the vulcanizing accelerators and vulcanization system. Usually, however, where the main objective is to improve the adhesion characteristics, 2–5 parts by weight is preferably used. On the other hand, where the main objective is to improve the cutting and the chipping resistance, 3–10 parts by weight should be used.

The rubber to be used may be a diene-type rubber; for example, natural rubber, polyisoprene rubber, polybutadiene rubber, styrene-butadiene copolymer rubber, acrylonitrilebutadiene copolymer rubber, chloroprene rubber, or mixture thereof, and a great many kinds of other rubber may be used.

With respect to a vulcanization system, well known sulfur-vulcanizing accelerator system, peroxide system, and the others may be used.

The vulcanizing accelerator may be selected from a wide variety of well known materials for this purpose; for example, a sulphenamide type, such as N-oxydiethylene benzothiazole sulphenamide; a thiazole type, such as 2-mercaptobenzothiazole; or a thiuram type, such as tetramethyl thiuram disulfide.

Other ingredients, such as zinc oxide, stearic acid, carbon black, or white carbon, can be used according to their purposes, as is well known to those skilled in the art.

With respect to the vulcanization temperature, the temperature used is that conventionally used in a vulcanization process.

Moreover, it has been found effective to mix in any of the compounds capable of generating formalin when heated, such as hexamethylenetetramine or hexamethylolmelamine.

This invention will now be explained with reference to the following examples. In these examples, the following tests were conducted on the resulting vulcanized rubber products.

Adhesion Test

Fabric was prepared by coating both faces of bronze-plated or brass-plated steel cords which were set in parallel and 3 mm apart, with the rubber composition (1 inch embedded) followed by vulcanization at 145° C for 45 minutes. The pulling out test of the steel cords was conducted according to ASTM D 2229.

Mooney Scorch Time ($t_5$)

It was measured according to JIS K 6301 (measuring temperature 125° C).

Cutting Resistance (Falling Weight Impact Test)

It was evaluated by measuring depth of a cut caused by dropping an edge of 12.98 kg made from steel onto the test piece of the vulcanized rubber composition from 25 cm in height. The data are shown as indexes corresponding to 100 of Standard 1. The larger the number, the better the effect.

Chipping Resistance (By Means of Dynamic Chipping Tester)

The tester is operated so as to stimulate chipping that occurs during actual driving, and the resistance is evaluated by measuring the loss in weight of the tire treads (volume cc = loss in weight g/specific gravity) caused by driving a miniature tire of 15 cm in diameter, 4 cm in width and about 750 g in weight with a lug pattern tread on a drum having a sharp projection made from steel, at a rotation velocity of 120 times per minute for 3 hours.

The data are shown as indexes corresponding to 100 of Standard 1, as in the cutting resistance, and the larger the number, the more advantageous the result.

EXAMPLES 1-4

Rubber compositions were prepared, as shown in Table 1, by mixing the master batch ingredients in a Banbury mixer, followed by mixing the master batch with the vulcanization ingredients in a roll mixer. Vulcanized rubber products were then prepared from the compositions for use in the various tests. Vulcanization took place for 45 minutes at 145° C.

The results of the above tests were performed on the vulcanized rubber products of Examples 1-4 as well as the Standard and Control samples are shown in Table 2.

resorcinol, as shown in the Control samples: the physical properties of vulcanized rubber are almost equal, the adhesive strength in brass-plated steel cords is almost equal or more, the adhesive strength in zinc-plated steel cords is extremely higher, the scorch is more retarded, the cutting resistance and the chipping resistance are extremely higher, no fume is generated during mixing operation at all, and it has not bloomed after mixing.

The reason why the scorch time in Example 4 is shorter than in Control 2 is that the addition amount of vulcanizing accelerator, N-oxydiethylene-2-benzothiazole sulphenamide in Example 4 is greater than in Control 2.

EXAMPLE 5

Mixing of the rubber composition, vulcanization and testing were conducted in the same manner as set forth in Examples 1-4, the ingredients of Example 5 being shown in Table 3 and the test results in Table 4.

TABLE 3

|  | Example 5 | Standard 2 | Control 3 |
|---|---|---|---|
| Master Batch: |  |  |  |
| natural rubber (RSS#1) | 100 | 100 | 100 |
| zinc oxide No. 3 | 5 | 5 | 5 |
| stearic acid | 3 | 3 | 3 |
| carbon black (HAF) | 45 | 45 | 45 |
| process oil | 5 | 5 | 5 |
| resorcinol | — | — | 3 |
| p-hydroxybenzoic acid | 3 | — | — |
| Vulcanization System: |  |  |  |
| sulfur | 4 | 4 | 4 |
| N-oxydiethylene-2- |  |  |  |

TABLE 1

|  | Example 1 | Example 2 | Example 3 | Example 4 | Standard 1 | Control 1 | Control 2 |
|---|---|---|---|---|---|---|---|
| Master Batch: |  |  |  |  |  |  |  |
| natural rubber (RSS#1) | 100 | 100 | 100 | 100 | 100 | 100 | 100 |
| zinc oxide No. 3 | 5 | 5 | 5 | 5 | 5 | 5 | 5 |
| stearic acid | 3 | 3 | 3 | 3 | 3 | 3 | 3 |
| carbon black (HAF) | 40 | 40 | 40 | 40 | 40 | 40 | 40 |
| hydrous silicic acid note 1) | 15 | 15 | 15 | 15 | 15 | 15 | 15 |
| process oil note 2) | 5 | 5 | 5 | 5 | 5 | 5 | 5 |
| resorcinol | — | — | — | — | — | 3 | — |
| primary condensate of resorcinol-formalin note 3) | — | — | — | — | — | — | 3 |
| p-hydroxy benzoic acid | 3 | — | — | 3 | — | — | — |
| o-hydroxy benzoic acid | — | 3 | — | — | — | — | — |
| benzoic acid | — | — | 3 | — | — | — | — |
| Vulcanization System: |  |  |  |  |  |  |  |
| sulfur | 3 | 3 | 3 | 3 | 3 | 3 | 3 |
| N-oxydiethylene-2-benzothiazole sulphenamide | 0.5 | 0.5 | 0.5 | 1 | 0.5 | 0.5 | 0.5 |
| hexamethylene tetramine | 2 | 2 | 2 | — | 2 | 2 | 2 |
| hexamethylol melamine | — | — | — | 2 | — | — | — | note 1) "Nipsil VN-3" (manufactured by Nippon Silica Co.)
note 2) aromatic type process oil
note 3) "Bonding agent R-6" (manufactured by Uniroyal Co.)

TABLE 2

|  | Example 1 | Example 2 | Example 3 | Example 4 | Standard 1 | Control 1 | Control 2 |
|---|---|---|---|---|---|---|---|
| Physical Properties: |  |  |  |  |  |  |  |
| tensile strength (kg/cm$^2$) | 238 | 230 | 226 | 236 | 227 | 232 | 226 |
| elongation (%) | 440 | 420 | 400 | 420 | 440 | 420 | 410 |
| 300% tensile stress (kg/cm$^2$) | 164 | 160 | 167 | 172 | 148 | 164 | 160 |
| hardness (JIS A) | 78 | 78 | 80 | 75 | 71 | 77 | 75 |
| scorch time (t$_s$) | 42 min. | 46 min. | 45 min. | 28 min. | 12 min. 30 sec. | 13 min. 12 sec. | 35 min. |
| Adhesive Strength (kg): |  |  |  |  |  |  |  |
| brass plated steel cord | 83 | 68 | 69 | 72 | 45 | 68 | 63 |
| zinc plated steel cord | 27 | 27 | 29 | 24 | 14 | 19 | 16 |
| cutting resistance (index) | 120 | 135 | — | — | 100 | — | — |
| chipping resistance (index) | 111 | 119 | — | — | 100 | — | — |
| fuming note 4) | none | none | none | none | none | much | little |
| blooming note 5) | none | none | none | none | none | much | little | note 4) judged by external appearance at Banbury's and Roll's mixing
note 5) judged by external appearance of the surface of the sheet after 5 days from manufacturing From Table 2, it is clear that the rubber compositions of these examples have the following features in comparison with known rubber compositions containing TABLE 3-continued

|  | Example 5 | Standard 2 | Control 3 |
|---|---|---|---|
| benzothiazole sulphenamide | 1 | 1 | 1 |

TABLE 4

|  | Example 5 | Standard 2 | Control 3 |
|---|---|---|---|
| Physical Properties: |  |  |  |
| tensile strength (kg/cm$^2$) | 235 | 227 | 220 |
| elongation (%) | 400 | 390 | 490 |
| 300% tensile stress (kg/cm$^2$) | 184 | 178 | 135 |
| hardness (JIS A) | 74 | 75 | 65 |
| scorch time (t$_s$) | 24 min. | 12 min. | 21 min. |
| Adhesive Strength (kg): |  |  |  |
| brass plated steel cord | 70 | 48 | 59 |
| zinc plated steel cord | 23 | 14 | 15 |
| fuming | none | none | much |
| blooming | none | none | much |

From Table 4, it is clear that the rubber composition of this example has almost the same physical properties as the known rubber composition and has the advantage of greater adhesive strength to steel cord and no fume and no bloom, which appear during mixing with resorcinol, and no bloom after mixing.

EXAMPLES 6–8

Mixing of the rubber compositions was conducted in the same manner as set forth in Examples 1–4, the ingredients being shown in Table 5, and the obtained compositions were vulcanized and tested as follows:

Vulcanization conditions for testing the physical properties were conducted at 148° C for 30 minutes.

Adhesive strength to nylon fiber: H-test by means of ASTM D 2138 (Vulcanization condition 148° C for 30 min.).

Other tests are the same as mentioned above.

The results of the tests performed on the vulcanized rubber compositions of Examples 6–8 as well as the Standard and Control samples are shown in Table 6.

TABLE 5

|  | Example 6 | Example 7 | Example 8 | Standard 3 | Control 4 | Control 5 |
|---|---|---|---|---|---|---|
| Master Batch: |  |  |  |  |  |  |
| natural rubber (RSS#1) | 100 | 100 | 100 | 100 | 100 | 100 |
| zinc oxide No. 3 | 5 | 5 | 5 | 5 | 5 | 5 |
| stearic acid | 3 | 3 | 3 | 3 | 3 | 3 |
| carbon black (HAF) | 30 | 30 | 30 | 30 | 30 | 30 |
| hydrous silicic acid | 10 | 10 | 10 | 10 | 10 | 10 |
| process oil | 5 | 5 | 5 | 5 | 5 | 5 |
| resorcinol | — | — | — | — | 2.5 | — |
| primary condensate of resorcinol-formalin | — | — | — | — | — | 2.5 |
| p-hydroxy benzoic acid | 2.5 | — | — | — | — | — |
| o-hydroxy benzoic acid | — | 2.5 | — | — | — | — |
| benzoic acid | — | — | 2.5 | — | — | — |
| Vulcanization System: |  |  |  |  |  |  |
| sulfur | 2 | 2 | 2 | 2 | 2 | 2 |
| N-oxydiethylene-2-benzothiazole sulphenamide | 1 | 1 | 1 | 1 | 1 | 1 |
| hexamethylene tetramine | 1.5 | 1.5 | 1.5 | 1.5 | 1.5 | 1.5 |

TABLE 6

|  | Example 6 | Example 7 | Example 8 | Standard 3 | Control 4 | Control 5 |
|---|---|---|---|---|---|---|
| Physical Properties: |  |  |  |  |  |  |
| tensile strength (kg/cm$^2$) | 264 | 263 | 261 | 259 | 261 | 260 |
| elongation (%) | 580 | 580 | 570 | 560 | 550 | 560 |
| 300% tensile stress (kg/cm$^2$) | 106 | 100 | 102 | 103 | 104 | 101 |
| hardness (JIS A) | 67 | 66 | 68 | 66 | 66 | 65 |
| scorch time (t$_s$) | 21 min. 24 sec. | 25 min. | 24 min. | 16 min. | 11 min. | 20 min. 30 sec. |
| Adhesive Strength (H test kg/cm$^2$): |  |  |  |  |  |  |
| non-treated nylon-66 cord | 6.1 | 6.4 | 6.0 | 3.1 | 7.2 | 6.0 |
| RFL-treated nylon-66 cord note 7) | 18.2 | 18.6 | 18.4 | 16.8 | 18.4 | 18.0 |
| fuming | none | none | none | none | much | little |
| blooming | none | none | none | little | much | little | note 7) RFL: resorcinol-formaldehyde latex

From Table 6, it is clear that the rubber compositions of these examples have almost the same physical properties as the known resorcinol containing composition, have longer scorch time and have stronger adhesion to nylon cord, that is, the same adhesive strength to both non-treated and RFL treated nylons as the known resorcinol compositions, and much greater adhesive strength in comparison with the Standard 3 composition (no resorcinol).

EXAMPLES 9–10

Mixing of the rubber compositions was conducted in the same manner as set forth in Examples 1–4, the ingredients of the compositions being shown in Table 7.

The resulting rubber compositions were vulcanized at 148° C for 30 minutes, and the test results are shown in Table 8.

TABLE 7

|  | Ex. 9 | Ex. 10 | Standard 4 | Control 6 |
|---|---|---|---|---|
| Master Batch: |  |  |  |  |
| natural rubber (RSS#1) | 100 | 100 | 100 | 100 |
| zinc oxide No. 3 | 5 | 5 | 5 | 5 |
| stearic acid | 3 | 3 | 3 | 3 |
| carbon black (HAF) | 50 | 50 | 50 | 50 |
| process oil | 5 | 5 | 5 | 5 |
| cyclopentadiene resin note 8) | — | — | — | 5 |
| p-hydroxy benzoic acid | 5 | — | — | — |
| o-hydroxy benzoic acid | — | 5 | — | — |
| Vulcanization System: |  |  |  |  |
| sulfur | 2 | 2 | 2 | 2 |
| N-oxydiethylene-2-benzothiazol sulphenamide | 0.5 | 0.5 | 0.5 | 0.5 |

TABLE 7-continued

|  | Ex. 9 | Ex. 10 | Standard 4 | Control 6 |
|---|---|---|---|---|
| hexamethylene tetramine | 2 | 2 | 2 | 2 | note 8) Picodiene 2215 (manufactured by Esso Chemical Co., Ltd.)

TABLE 8

|  | Ex. 9 | Ex. 10 | Standard 4 | Control 6 |
|---|---|---|---|---|
| Physical Properties: |  |  |  |  |
| tensile strength (kg/cm$^2$) | 263 | 266 | 265 | 261 |
| elongation (%) | 460 | 490 | 530 | 500 |
| 300% tensile stress (kg/cm$^2$) | 165 | 153 | 143 | 151 |
| hardness (JIS A) | 74 | 71 | 67 | 65 |
| cutting resistance (index) | 111 | 129 | 100 | 108 |
| chipping resistance (index) | 106 | 128 | 100 | 103 |

From Table 8, it is clear that the rubber compositions of these examples have more improved cutting resistance and chipping resistance than the known rubber compositions.

EXAMPLES 11–12

Mixing of the rubber compositions was conducted in the same manner as set forth in Examples 9 and 10, and the resulting rubber compositions were vulcanized and tested in the same manner as set forth in Examples 9 and 10.

The ingredients are shown in Table 9 and the test results are shown in Table 10.

TABLE 9

|  | Ex. 11 | Ex. 12 | Standard 5 | Control 7 |
|---|---|---|---|---|
| Master Batch: |  |  |  |  |
| natural rubber (RSS#1) | 100 | 100 | 100 | 100 |
| zinc oxide No. 3 | 5 | 5 | 5 | 5 |
| stearic acid | 3 | 3 | 3 | 3 |
| carbon black (HAF) | 40 | 40 | 40 | 40 |
| process oil | 5 | 5 | 5 | 5 |
| hydrous silicic acid | 15 | 15 | 15 | 15 |
| cyclopentadiene resin | — | — | — | 5 |
| p-hydroxy benzoic acid | 5 | — | — | — |
| o-hydroxy benzoic acid | — | 5 | — | — |
| Vulcanization System: |  |  |  |  |
| sulfur | 2 | 2 | 2 | 2 |
| N-oxydiethylene-2-benzothiazole sulphenamide | 0.5 | 0.5 | 0.5 | 0.5 |
| hexamethylene tetramine | 2 | 2 | 2 | 2 |

TABLE 10

|  | Ex. 11 | Ex. 12 | Standard 5 | Control 7 |
|---|---|---|---|---|
| Physical Properties: |  |  |  |  |
| tensile strength (kg/cm$^2$) | 267 | 269 | 270 | 265 |
| elongation (%) | 520 | 550 | 550 | 510 |
| 300% tensile stress (kg/cm$^2$) | 137 | 132 | 124 | 125 |
| hardness (JIS A) | 67 | 68 | 65 | 64 |
| cutting resistance (index) | 127 | 153 | 100 | 123 |
| chipping resistance (index) | 118 | 129 | 100 | 112 |

From Table 10, it is clear that the rubber compositions of these examples have more cutting resistance than the known rubber compositions.

EXAMPLES 13–14

Mixing of the rubber compositions was conducted in the same manner as set forth in Examples 9 and 10, and the resulting rubber compositions were vulcanized and tested in the same manner as set forth in Examples 9 and 10.

The ingredients are shown in Table 11 and the test results are shown in Table 12.

TABLE 11

|  | Ex. 13 | Ex. 14 | Standard 6 | Control 8 |
|---|---|---|---|---|
| Master Batch: |  |  |  |  |
| SBR 1500 | 100 | 100 | 100 | 100 |
| zinc oxide No. 3 | 5 | 5 | 5 | 5 |
| stearic acid | 3 | 3 | 3 | 3 |
| carbon black (HAF) | 50 | 50 | 50 | 50 |
| process oil | 10 | 10 | 10 | 10 |
| cyclopentadiene resin | — | — | — | 5 |
| p-hydroxy benzoic acid | 5 | — | — | — |
| o-hydroxy benzoic acid | — | 5 | — | — |
| Vulcanization System: |  |  |  |  |
| sulfur | 2 | 2 | 2 | 2 |
| N-oxydiethylene-2-benzothiazole sulphenamide | 0.8 | 0.8 | 0.8 | 0.8 |
| hexamethylene tetramine | 2 | 2 | 2 | 2 |

TABLE 12

|  | Ex. 13 | Ex. 14 | Standard 6 | Control 8 |
|---|---|---|---|---|
| Physical Properties: |  |  |  |  |
| tensile strength (kg/cm$^2$) | 205 | 199 | 193 | 200 |
| elongation (%) | 420 | 420 | 430 | 440 |
| 300% tensile stress (kg/cm$^2$) | 140 | 136 | 122 | 121 |
| hardness (JIS A) | 67 | 71 | 63 | 61 |
| cutting resistance (index) | 123 | 159 | 100 | 118 |
| chipping resistance (index) | 120 | 136 | 100 | 115 |

From Table 12, it is clear that the rubber compositions of these examples have improved cutting resistance and chipping resistance over known rubber compositions.

As is clear from the above description, the novel rubber compositions of this invention have been shown to have excellent scorch stability, excellent adhesion to steel cords and nylon cords, and excellent chipping and cutting resistance. Accordingly, they can be excellently used as new adhesive agents for rubber and also as new agents for improving cutting resistance and chipping resistance.

What is claimed is:

1. A vulcanizable rubber composition that is fumeless during mixing together of the composition comprising a rubber selected from the group consisting of natural rubber, polyisoprene rubber, polybutadiene rubber, styrene-butadiene copolymer rubber, acrylonitrile-butadiene copolymer rubber, chloroprene rubber or mixtures thereof, a formalin generating compound selected from the group consisting of hexamethylenetetramine or hexamethylolmelamine; hydrous silicic acid; and benzoic acid or monohydroxy benzoic acid in the range of from 1 to 20 parts by weight per 100 parts of the rubber.

2. The rubber composition of claim 1, in which the benzoic or monohydroxy benzoic acid is present in the range of from 2 to 5 parts by weight per 100 parts of the rubber.

3. The rubber composition of claim 1, in which the benzoic or monohydroxy benzoic acid is present in the range of from 3 to 10 parts by weight per 100 parts of the rubber.

4. The rubber composition of claim 1, in which the monohydroxy benzoic acid is o-hydroxy benzoic acid.

5. The rubber composition of claim 1, in which the monohydroxy benzoic acid is m-hydroxy benzoic acid.

6. The rubber composition of claim 1, in which the monohydroxy benzoic acid is p-hydroxy benzoic acid.

* * * * *